United States Patent [19]

Nakayama et al.

[11] Patent Number: 4,841,136
[45] Date of Patent: Jun. 20, 1989

[54] SIGHTING APPARATUS WITH AUTOMATIC CORRECTION MECHANISM

[75] Inventors: Yasuyuki Nakayama; Tomoya Sada, both of Chofu, Japan

[73] Assignee: Mizoguchi Manufacturing Company Limited, Aichi, Japan

[21] Appl. No.: 133,275

[22] Filed: Dec. 15, 1987

[30] Foreign Application Priority Data

Dec. 18, 1986 [JP] Japan .......................... 61-195120[U]

[51] Int. Cl.⁴ .............................................. G01D 5/34
[52] U.S. Cl. .................................... 250/231 R; 33/366
[58] Field of Search ............. 250/231 R; 33/379, 365, 33/366, 348.2

[56] References Cited

U.S. PATENT DOCUMENTS

| | | |
|---|---|---|
| 1,498,177 | 6/1924 | Leonard . |
| 2,592,941 | 4/1952 | Moore ................................. 33/366 |
| 3,863,067 | 1/1975 | Gooley ................................ 33/366 |
| 4,265,027 | 5/1981 | Burniski ............................. 33/366 |
| 4,333,242 | 6/1982 | Genho, Sr. ......................... 33/227 |
| 4,590,680 | 5/1986 | Hanchett ........................... 33/366 |
| 4,720,920 | 1/1988 | Tudek ................................. 33/366 |

FOREIGN PATENT DOCUMENTS 60-88930 5/1985 Japan .
61-215913 9/1986 Japan .
61-215914 9/1986 Japan .
59223186 12/1988 Japan .

*Primary Examiner*—David C. Nelms
*Attorney, Agent, or Firm*—Oliff & Berridge

[57] ABSTRACT

A sighting apparatus comprising an optical system which includes a laser oscillator and an automatic correction mechanism mounted on a rotational table, wherein the laser beams from the oscillator are emitted in any horizontal direction by remote control. A circular air bubble tube is provide on the table such that the position of an air bubble in the tube is sensed by a photosensor to recognize the tilt of the table. When the tilt of the table exceeds an effective operation range of the automatic correction mechanism, an interrupter circuit is operated to interrupt a power source circuit for the laser oscillator.

3 Claims, 3 Drawing Sheets

SIGHTING APPARATUS WITH AUTOMATIC CORRECTION MECHANISM

BACKGROUND OF THE INVENTION

1. Field of the Invention

This invention relates to a sighting apparatus using a laser beam, and more particularly to such apparatus which is capable of emitting a laser beam in any horizontal direction by remote control.

2. Description of the Prior Art

A sighting apparatus of this kind is already disclosed in the Japanese Patent Application Laid-open Nos. 215913/1986 and 215914/1986. This apparatus includes a rotatable table supported on a base, a laser oscillator and an optical system which guides the laser beams emitted from the laser oscillator in the horizontal direction whereby the table is rotated by remote control. Even a sole user can perform a survey using this apparatus, so that the use of this apparatus has spread.

As shown in FIG. 5, the optical system includes a collection lens 3 which collects the laser beams 2 emitted from the laser oscillator 1, an automatic correction mechanism 4 which corrects the laser beams passing through the collection lens 3 so as to emit horizontally, an objective 5 which images the laser beams from correction mechanism 4 onto an object as a reference point or line, and a focusing lens 6 which is disposed movably in the direction of the optical axis between the correction mechanism 4 and the objective 5.

For example, as shown in FIG. 6, the automatic correction mechanism 4 includes three mirrors 4, namely, two inclined mirrors 7a and 7b and a flat-plate mirror C. The two inclined mirrors 7a and 7b are fixed to the casing 8, and the flat-plate mirrors 7c is suspended by a plurality of (usually four) suspended threads 10 to a support plate 9 to which the casing 8 is fixed. Thus even if the casing or the table may be inclined, the flat-plate mirror 7c is translated so that the laser beams are emitted horizontally at all times. Thus even if the sighting apparatus may be inclined for some reason during remote control, the direction in which the laser beams are emitted is corrected due to the presence of the automatic correction mechanism 4 to maintain the reliability on the accuracy of the apparatus.

However, of course, in the mechanism 4, the range of movement of flat-plate mirror 7c is limited within a fixed range, so that when the mirror 7c is moved out of the effective operation range, the laser beams are not emitted horizontally and erroneous survey may be performed. Especially, in the sighting apparatus which uses remote control, the user performs a survey at a place remote from the aligning apparatus, so that he cannot ascertain the occurrence of the trouble in advance and the accuracy of survey itself is seriously influenced

SUMMARY OF THE INVENTION

This invention is intended to solve the above problems. The object of this invention is to provide an sighting apparatus which recognizes in advance the tilt of the table exceeding an effective operation range of the automatic correction mechanism to thereby prevent erroneous survey.

This invention is characterized by a circular air bubble tube disposed on a table on which an optical system comprising the automatic correction mechanism is provided such that an air bubble is positioned at the center of the tube when the table is in a horizontal state, a photosensor disposed on the table which senses the position of the air bubble in the tube, and an interrupter circuit which interrupts a power source circuit for the laser oscillator in accordance with a signal from the photosensor.

In this invention, preferably, the photosensor includes a light emitting element, a collimator which changes light beams from the light emitting element to a parallel light beam, and a photoelectric conversion element which receives the parallel light beams having passed through the circular air bubble tube.

In the sighting apparatus, the tilt of the table on which the optical system is mounted can be sensed by sensing the position of the air bubble in the tube using the photosensor. If an interrupter circuit is provided which interrupts a power source circuit for the laser oscillator when the tilt exceeds the effective operation range of the automatic correction mechanism, the user can recognize the trouble in advance by stoppage of emission of the laser beams to prevent erroneous survey in advance By the use of the circular air bubble tube, the tilt of the table in any direction can be recognized to improve the safety of the survey.

DETAILED DESCRIPTION OF THE INVENTION

An embodiment of this invention will now be described with reference to the accompanying drawings.

Figure 1:
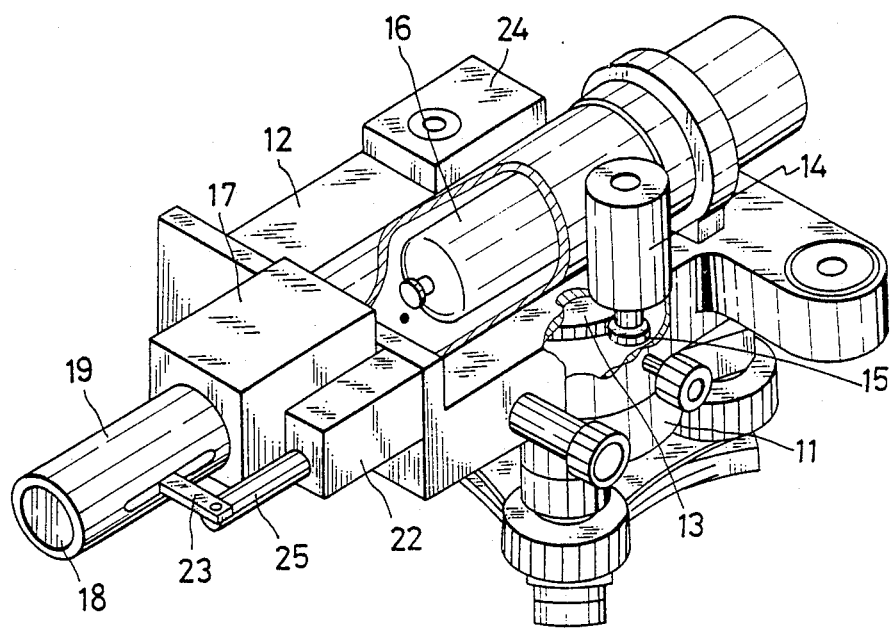
FIG. 1 is a perspective view of a sighting apparatus according to this invention.
Figure 2:
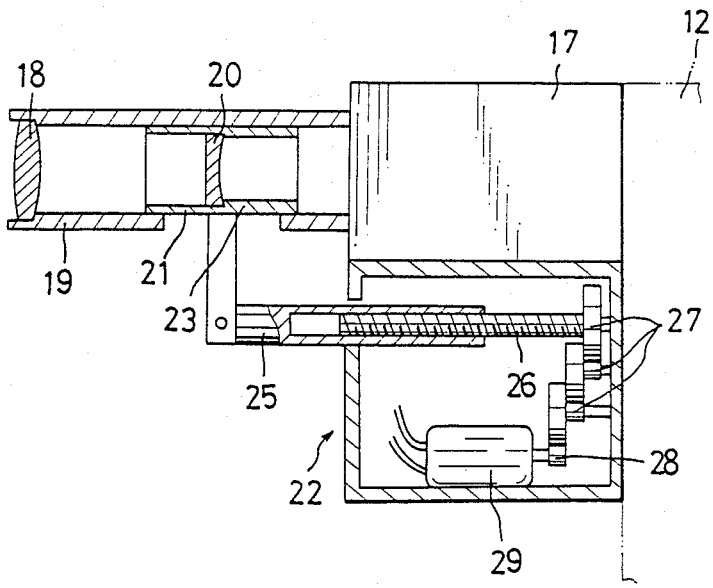
FIG. 2 is a cross-section view of a drive unit for a focusing lens.

In FIGS. 1 and 2, reference numeral 11 denotes a base on which a table 12 is supported rotatably using a vertical shaft (not shown) Provided on the base 11 is a follower gear 13 integrally with the vertical shaft with same as the center. Provided fixedly on the table 12 is a motor 14, the output shaft of which has at its end a drive gear 15 meshing with the follower gear 13 so that the table 12 can rotate by the rotation of the motor 14. Reference numeral 16 denotes a laser oscillator fixed to the table 12. A casing 17 which contains an automatic correction mechanism (FIG. 6) similar to that mentioned above, and a fixed mirror cylinder 19 which holds an objective 18 are successively disposed on the table 12 in the direction of emission of the laser beams. The fixed mirror cylinder 19 contains a slidable mirror cylinder 21 which holds a focusing lens 20 and a drive unit 22, to be described later, fixed on the table 12 is connected via a connection arm 23 to the mirror cylinder 21 such that the mirror cylinder 21 moves along the optical axis by the operation of the drive unit 22.

Disposed on the table 12 is a casing 24 which contains a safeguard unit (to be described later) which operates when the automatic correction mechanism exceeds an allowable operation range. The sighting apparatus includes a circuit which performs remote control of the motor 14 and an adjusting unit which rotates the motor 14 in the direction in which the drive gear 15 moves away from the follower gear 13. The motor 14 can be moved away from base 11 by the operation of the adjusting unit so that the table 12 can be rotated manually. The sighting apparatus further includes a level which levels the entire apparatus when installed.

As shown in detail in FIG. 2, the drive unit 22 includes a female member 25 fixed at one end to the connection arm 23, a ball screw 26 turned threadedly into the female member 25, a reduction gear train 27 which supports the ball screw 26, and a motor 29 which has an output shaft, to an end of which is attached a gear 28 meshing with the reduction gear train 27. The motor 29 is rotatable by remote control. If the motor 29 is rotated by remote control, the rotation of the motor is transmitted via the gear 28 and reduction gear train 27 to the ball screw 26. As a result, the female member 25 moves along the ball screw 26 to move the movable mirror cylinder 21 through the inside of the fixed mirror cylinder 19.

Figure 3:
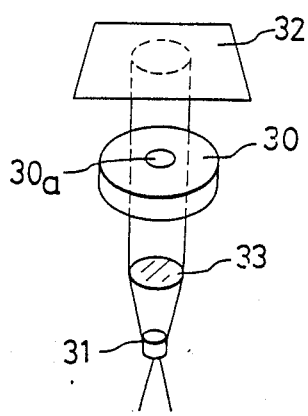
FIG. 3 is a schematic view of a sensor constituting a part of a safeguard unit.
Figure 4:
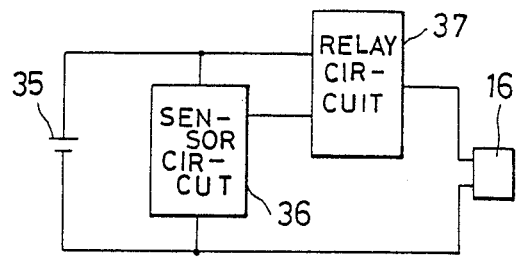
FIG. 4 is a diagram of an interrupter circuit for the safeguard unit.
Figure 5:
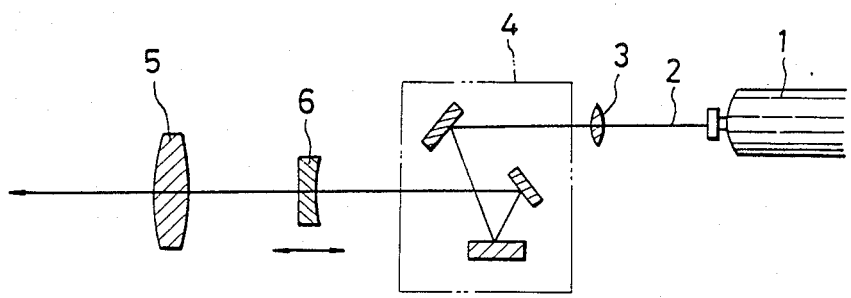
FIG. 5 is a layout of a basic optical system of the sighting apparatus.

The safeguard unit contained in the casing 24 includes a sensor which senses the magnification of the tilt of the table 12 and an interrupter circuit which operates to interrupt a power source circuit for the laser oscillator 16 in response to the signal from the sensor. As shown in FIG. 3, the sensor includes a circular air bubble tube 30, a light emitting element 31 and a photo electric conversion element 32 disposed respectively above and below the tube 30, and a collimator 23 which converts to parallel light the rays of light from light emitting element 31 disposed between the tube 30 and element 31. The element 32 includes, for example, a CCD image sensor which senses quantitatively the position of an air bubble 30a in the tube 30 projected onto this sensor. Therefore, if the circular air bubble tube 30 is disposed so that the air bubble 30a is positioned at the center of the tube when the table 12 is in a horizontal state, a tilt of the table 12 in any direction can be sensed. As shown in FIG. 4, the interrupter circuit includes a sensor circuit 36 interposed in the circuit connecting the oscillator 16 and a power source therefor, and a relay circuit 37 for the sensor circuit 36. The sensor circuit 36 is constructed by the photoelectric conversion element 32 itself. When the position of the air bubble 30a projected onto the photoelectric conversion element 32 is out of a predetermined range (an effective operation range of the automatic correction mechanism), the relay circuit operates to interrupt the supply of electric power to the laser oscillator 16.

First, the sighting apparatus is installed in place by roughly ascertaining the horizontal state of the apparatus using a level (not shown), and the table 12 is then rotated to position the fixed mirror cylinder 19 so that same substantially faces an object. When the user has finished this preparation, he leaves the sighting apparatus, goes to the object and rotates the motor 14 and hence the table 12 by remote control such that the laser beams from the laser oscillator 16 are irradiated onto a predetermined position on the subject. Thereafter, he rotates the motor 29 forwardly and backwardly by remote control to focus the minimum reference point or line by movement of the movable mirror cylinder 21 or focusing lens 20.

When the table 12 is tilted due to vibrations, collision with foreign substance, or for some other reason during remote control, and the tilt angle is small, the automatic collection mechanism operates to automatically correct the laser beam from the laser oscillator 16 so as to be oriented horizontally. When the tilt angle of the table is out of an effective operation range of the correction mechanism 17, a change in the position of the air bubble 30a in the tube 30 is sensed by a photoelectric conversion element 32 (FIG. 3) in the safeguard unit 24. As a result, the relay circuit 37 of the interrupter circuit (FIG. 4) operates to interrupt a power supply to the laser oscillator 16. By the stoppage of the laser beam emission, the user can recognize the trouble in advance.

Figure 6:
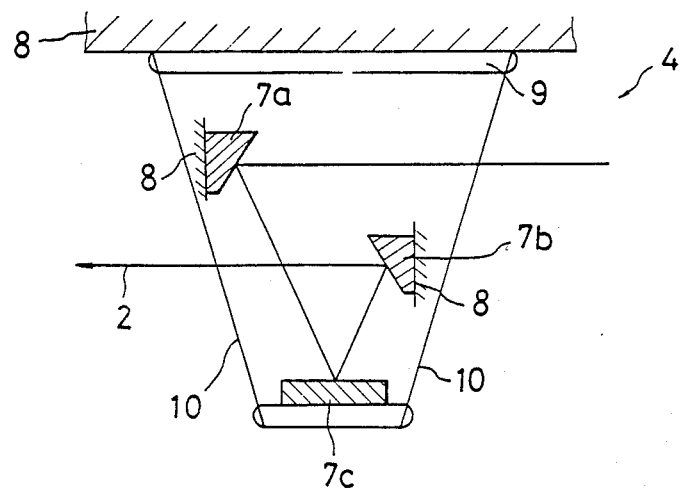
FIG. 6 is a layout of an automatic correction mechanism of the apparatus.

The automatic correction mechanism is not limited to the one having a group of mirrors shown in FIG. 6 and may be replaced with other elements.

What is claimed is:

1. A sighting apparatus comprising a table provided rotatably on a base, and a laser oscillator an optical system including an automatic correction mechanism being mounted on the table, the table being rotated by remote control, characterized by a circular air bubble tube provided on the table such that an air bubble is positioning at the center of the tube when the table is in a horizontal state, a photosensor disposed on the table for sensing the position of the air bubble in the tube, and an interruption circuit provided on the table for interrupting a power source for the laser oscillator in accordance with a signal from the photosensor which is generated when the table is tilted beyond an angle range in which the automatic correction mechanism operates effectively.

2. A sighting apparatus of claim 1, wherein the photosensor includes a light emitting element, a collimator for changing the light from the light emitting element to parallel light, and a photoelectric conversion element.

3. A sighting apparatus of claim 2, wherein the photoelectric conversion element includes an image sensor.

* * * * *